United States Patent
Evgrafov et al.

[15] 3,684,944
[45] Aug. 15, 1972

[54] RECTIFIER FOR AN ELECTRIC GENERATOR

[72] Inventors: Boris Ivanovich Evgrafov; Jury Alexandrovich Kupeev; Galina Iosifovna Turok, all of Moscow, U.S.S.R.

[73] Assignee: Nauchno-issledovatelsky i experimentalny institut Aoromobilnogg elecktrooborudovania i avtopriboroo, Moscow, U.S.S.R.

[22] Filed: July 9, 1971

[21] Appl. No.: 161,097

[52] U.S. Cl. ................................321/8, 310/68 D
[51] Int. Cl. ..........................................H02m 7/00
[58] Field of Search......310/68 D; 317/234 W; 321/8

[56] References Cited

UNITED STATES PATENTS

| | | |
|---|---|---|
| 3,160,771 | 12/1964 | Martin et al............321/8 R X |
| 3,275,921 | 9/1966 | Fellendorf et al..........321/8 R |
| 3,522,513 | 8/1970 | Vogt........................321/8 R |
| 3,612,927 | 10/1971 | Anisimov................310/68 D |

Primary Examiner—William M. Shoop, Jr.
Attorney—Eric H. Waters et al.

[57] ABSTRACT

A rectifier for an electric generator, set up in a three-phase full-wave circuit, the metal case of which is in two parts each having on the joint surface an insulating base with built-in connecting tags for application of three-phase voltage to the semiconductor elements arranged inside each part of the case. The bolts holding together the cast parts simultaneously serve as d.c. output terminals for the rectifier and fasten the rectifier to a generator.

1 Claim, 5 Drawing Figures

PATENTED AUG 15 1972 3,684,944

RECTIFIER FOR AN ELECTRIC GENERATOR

The present invention relates to electric machines and, more specifically, to rectifiers for the electric generators used as supply sources for motor vehicles.

Known in the prior art is a rectifier for an automotive electric generator, set up in a three-phase full-wave circuit the semiconductor elements of which are combined in three groups, each group having two elements connected series aiding. Each group is built into a metal case to which a phase voltage of the generator is applied. The like leads of the semiconductor elements are taken to current-collecting buses which serve as d.c. terminals for the rectifier.

Among the disadvantages of this prior-art rectifier are that an inter-phase short may occur in service and also that it has an elaborate design.

Also known in the prior art is a rectifier for an automotive generator, likewise set up in a three-phase full-wave circuit whose semiconductor elements, which are encased diodes, are combined into two groups so that the elements of one group are fastened to one part of a split metal case and connected to it with their P-regions while the elements of the other group are fastened to the other part of the case and connected to it with its N-regions. This rectifier is built into the generator frame and cooled by the same air stream as the generator itself. Placed inside the generator frame, the rectifier is difficult of access for servicing. It should also be noted that this rectifier is complicated in design, since it uses encased diodes which require elaborate fixation of the case parts to one another. Separate bolts are also required to fasten this rectifier to the generator cover.

It is an object of the present invention to provide a rectifier for an electric generator, which has sufficient heat abstraction for its placement outside the generator frame and is, at the same time, simple in design and reliable in operation.

With this object in view, the present invention resides in that in a rectifier for an electric generator according to the invention each part of the case has at the joint surface an insulating base with built-in connecting tags for application of three-phase voltage to rectifying elements, and the parts of the case are held together by bolts simultaneously serving as d.c. output terminals for the rectifier and as means for fixation of the rectifier to the generator.

The invention will be more fully understood from the following description of a preferred embodiment when read in connection with the accompanying drawings wherein.

Figure 1:
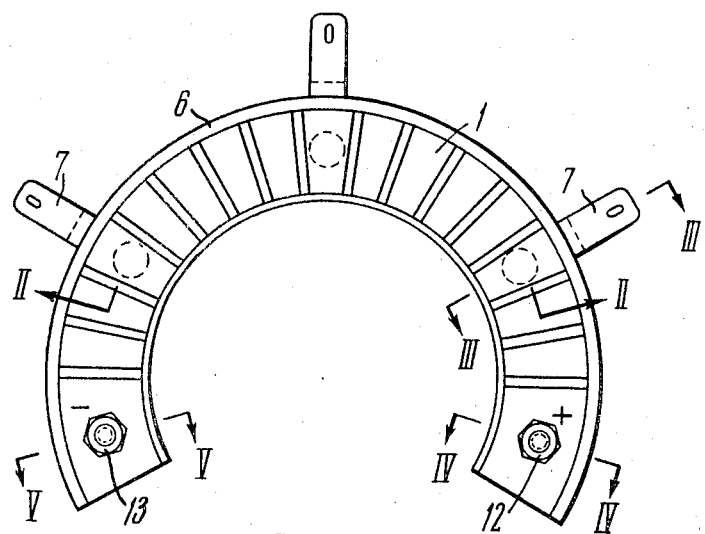
FIG. 1 shows a top view of a rectifier, according to the invention.
Figure 2:
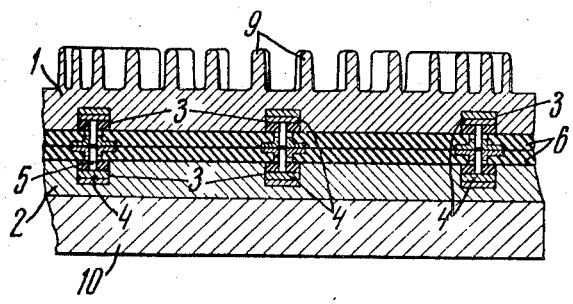
FIG. 2 shows section II—II of FIG. 1, according to the invention.

Referring to FIGS. 1 and 2, there is a rectifier which comprises a metal case made up of two parts 1 and 2, each of which has three recesses 3 holding encapsulated semiconductor elements (P-N junctions) 4 having flexible leads 5.

The semiconductor elements 4 are electrically connected to the parts 1 and 2 of the case by soldering so that one part of the case is in contact with the P-regions and the other part of the case is in contact with the N-regions of the semiconductor elements 4. The parts 1 and 2 of the case have each an insulating base 6 of the same construction.

Figure 3:
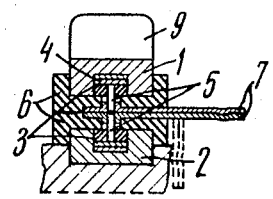
FIG. 3 shows section III—III of FIG. 1, according to the invention.

In each insulating base 6 (FIG. 3) there are three connecting tags 7, anchored in the base as it is cast or by any other method; the tags 7 are electrically connected to the flexible leads 5 by soldering or welding.

To improve heat abstraction, the part 1 (FIG. 2) of the case has fins 9, and the part 2 of the case is attached directly to a cover 10 of the generator (not shown), exchanges heat and is in electric contact with it.

Figure 4:
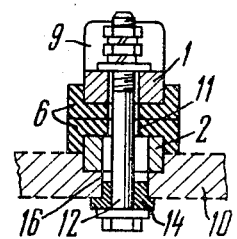
FIG. 4 shows section IV—IV of FIG. 1, according to the invention.
Figure 5:
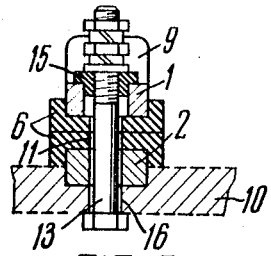
FIG. 5 shows section V—V of FIG. 1, according to the invention.

Referring to FIGS. 4 and 5, the parts 1 and 2 of the metal case and the insulating bases 6 have holes 11 through which fastening bolts 12 and 13 are passed. The bolt 12 serves at the same time as a positive terminal and the bolt 13, as a negative terminal for the rectifier.

The bolt 12 (FIG. 4) is insulated from the generator cover 10 and the part 2 of the metal case by an insulating grommet 14 and is in electric contact with the part 1 of the metal case.

The bolt 13 (FIG. 5) is insulated from the part 1 of the metal case by an insulating grommet 15 and is in electric contact with the generator cover 10 and the part 2 of the metal case. The part 1 of the metal case and its insulating base 6 are brought in register with the part 2 of the case so that the leads 5 of the semiconductor elements 4 corresponding to the full-wave circuit arrangement are in contact with one another via the connecting tags 7.

The rectifier is fastened to the generator cover 10 by the same bolts 12 and 13 passing through the holes 16 in the generator cover 10.

The three-phase voltage of the generator is applied over the tags 7 to the rectifying elements 4 combined into two groups set up in a full-wave rectification circuit, with the result that a direct voltage appears across the parts 1 and 2 of the case and the bolts 12 and 13.

An advantage of the rectifier disclosed herein lies in that it has good heat abstraction and may be installed outside the generator cover owing to which easy access is provided to it for servicing. Besides, the rectifier disclosed herein is simple in design, as it consists of only two parts which may be held together by only two bolts simultaneously serving as a means for the fixation of the rectifier to the generator cover and as d.s. terminals.

What is claimed is:

1. A rectifier for an electric generator, set up in a three-phase full-wave circuit, comprising: a split metal case made up of two parts; semiconductor elements arranged in one of the parts of said split case and connected to it with their P-regions; other semiconductor elements arranged in the other part of said split case and connected to it with their N-regions; insulating bases fastened each to the joint surface of the two parts of said case; connecting tags built into said insulating bases and intended for application of three-phase voltage to all of the said semiconductor elements; two bolts holding together the two said parts of the case and fastening the rectifier to the generator, which also serve as d.c. output terminals for the rectifier.

* * * * *